UNITED STATES PATENT OFFICE.

UTLEY WEDGE, OF ARDMORE, PENNSYLVANIA.

TREATING IRON PYRITES FOR DESULFURIZATION.

No. 804,785.        Specification of Letters Patent.        Patented Nov. 14, 1905.

Original application filed June 15, 1904, Serial No. 212,705. Divided and this application filed November 22, 1904. Renewed July 26, 1905. Serial No. 271,392.

*To all whom it may concern:*

Be it known that I, UTLEY WEDGE, a citizen of the United States, residing in Ardmore, Pennsylvania, have invented certain Improvements in Treating Iron Pyrites for Desulfurization, (the same being a division of my application, Serial No. 212,705, filed June 15, 1904,) of which the following is a specification.

My invention consists of an improvement in or modification of that forming the subject of my Letters Patent No. 757,531, dated April 19, 1904, the object of my present invention being to effect the formation of the "pyrites fines" or "pyrites smalls" into lumps, blocks, or briquets by the use of a binding agent or agents which may in many cases be considered preferable to that formerly used.

The present invention consists in the use of nitrate of soda in or as the binding agent for the pyrites.

The nitrate of soda may be mixed with the pyrites fines or pyrites smalls and the latter formed into blocks, bricks, or lumps in any suitable way, so that both sulfur and niter fumes will result from the heating of the pyrites in the furnace or oven, and a much less quantity of nitrate of soda and sulfuric acid will be needed in the niter-oven, the latter only being employed as a regulator or to supply the limited volume of nitric-acid fumes necessary to complete the process.

In many cases it may be advisable to employ the nitrate of soda as an addition to the sulfate of iron used as a binder for the pyrites in accordance with the invention of my former patent, for the pyrites sometimes contains a small quantity of monosulfid of iron, and the sulfate of iron ordinarily contains some excess sulfuric acid, which acts upon the monosulfid of iron to form sulfureted hydrogen, which in turn acts upon the ferric sulfate, reducing it to ferrous sulfate, which is not as good a binder as the ferric sulfate. When nitrate of soda is present, however, the sulfureted hydrogen is acted upon by the same to produce sulfuric acid, and the ferric sulfate is not reduced.

The presence of free sulfuric acid in the block or briquet has in time the effect of softening or disintegrating the same either because of hygroscopic action or chemical reaction; but the use of nitrate of soda in sufficient quantity to neutralize such free sulfuric acid overcomes this objection, and therefore renders unnecessary the addition of carbonate or oxid of lime, barium, or like reagent, which might otherwise have to be used to neutralize the excess sulfuric acid in the sulfate of iron. The addition of such reagent would result in the formation of its sulfate, and while this would tend to harden the briquet its use in any considerable quantity would interfere with the proper desulfurization of the pyrites.

In case nitrate of soda is used in connection with neutral sulfate of iron its presence assists in the desulfurization of the resultant briquet because of the energetic reaction between sulfate of iron and nitrate of soda when heated together.

Lumps, blocks, or briquets of pyrites fines or pyrites smalls made in accordance with my present invention possess all of the advantages of those of the former patent in that they contain no foreign element which will adulterate the sulfurous-acid gas or retard the subsequent conversion of said gas into sulfuric acid. In fact, when the nitrate of soda is used as a binder such conversion is, as before indicated, facilitated instead of being retarded. The present invention also possesses the same advantage as the former one in rendering available for roasting in rock-ore kilns or burners those pyrites fines or pyrites smalls which are in their natural state only available for roasting in mechanical furnaces.

Having thus described my invention, I claim and desire to secure by Letters Patent—

1. The mode herein described of preparing "pyrites fines" or "pyrites smalls" for desulfurization, said mode consisting in mixing them with a binder containing nitrate of soda, and forming the mass into lumps, blocks or briquets, substantially as specified.

2. The mode herein described of preparing "pyrites fines" or "pyrites smalls" for desulfurization, said mode consisting in mixing them with a binder containing nitrate of soda and sulfate of iron, and forming the mass into lumps, blocks or briquets, substantially as specified.

3. As a new article of manufacture, a lump, block or briquet composed of "pyrites fines"

or "pyrites smalls," and a binder containing nitrate of soda, substantially as specified.

4. As a new article of manufacture, a lump, block or briquet composed of "pyrites fines" or "pyrites smalls," and a binder containing nitrate of soda and sulfate of iron, substantially as specified.

In testimony whereof I have signed my name to this specification in the presence of two subscribing witnesses.

UTLEY WEDGE.

Witnesses:
M. ELVA NEVILLE,
MAY B. McDERMOTT.